(12) United States Patent
Jang et al.

(10) Patent No.: US 8,848,630 B2
(45) Date of Patent: Sep. 30, 2014

(54) APPARATUS AND METHOD FOR SUPPORTING HYBRID AUTOMATIC REPEAT REQUEST FOR ANONYMOUSLY ALLOCATED BANDWIDTH IN BROADBAND WIRELESS COMMUNICATION SYSTEM

(75) Inventors: Jae-Hyuk Jang, Suwon-si (KR); Jae-Weon Choi, Seongnam-si (KR); Hyun-Kyu Yu, Seoul (KR); Won-Il Roh, Yongin-si (KR); Jae-Jeong Shim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 251 days.

(21) Appl. No.: 13/089,644

(22) Filed: Apr. 19, 2011

(65) Prior Publication Data

US 2011/0268091 A1 Nov. 3, 2011

(30) Foreign Application Priority Data

May 3, 2010 (KR) .................. 10-2010-0041313

(51) Int. Cl.
*H04W 4/00* (2009.01)
*H04L 1/18* (2006.01)
(52) U.S. Cl.
CPC ............. *H04L 1/1896* (2013.01); *H04L 1/1893* (2013.01)

USPC ........................................... 370/329; 370/328
(58) Field of Classification Search
None
See application file for complete search history.

(56) References Cited

U.S. PATENT DOCUMENTS

| | | | | |
|---|---|---|---|---|
| 2003/0133408 | A1* | 7/2003 | Cheng et al. | 370/230 |
| 2007/0155378 | A1* | 7/2007 | Lee et al. | 455/423 |
| 2007/0191009 | A1* | 8/2007 | Hong et al. | 455/436 |
| 2007/0291680 | A1* | 12/2007 | Machida | 370/328 |
| 2008/0310361 | A1* | 12/2008 | Cho et al. | 370/329 |
| 2010/0027462 | A1 | 2/2010 | Lee et al. | |
| 2010/0041399 | A1 | 2/2010 | Kim et al. | |
| 2010/0267386 | A1* | 10/2010 | Lim et al. | 455/436 |

\* cited by examiner

*Primary Examiner* — Kibrom T Hailu
*Assistant Examiner* — James P Duffy
(74) *Attorney, Agent, or Firm* — Jefferson IP Law, LLP

(57) ABSTRACT

An apparatus and method for supporting Hybrid Automatic Repeat reQuest (HARQ) for an anonymously allocated bandwidth in a broadband wireless communication system are provided. The method of a terminal includes obtaining classification information of HARQ support ranging codes from a message received from a base station, to request an anonymously allocated resource, transmitting one of the HARQ support ranging codes, receiving a resource allocation message including HARQ related information and anonymous resource allocation information, and transmitting one of a ranging request message and a bandwidth request header according to the resource allocation information.

34 Claims, 6 Drawing Sheets

APPARATUS AND METHOD FOR SUPPORTING HYBRID AUTOMATIC REPEAT REQUEST FOR ANONYMOUSLY ALLOCATED BANDWIDTH IN BROADBAND WIRELESS COMMUNICATION SYSTEM

PRIORITY

This application claims the benefit under 35 U.S.C. §119(a) of a Korean patent application filed in the Korean Intellectual Property Office on May 3, 2010 and assigned Serial No. 10-2010-0041313, the entire disclosure of which is hereby incorporated by reference.

BACKGROUND OF THE INVENTION

1. Field of the Invention

The present invention relates to a broadband wireless communication system. More particularly, the present invention relates to an apparatus and a method for supporting hybrid automatic repeat request for anonymously allocated bandwidth in a broadband wireless communication system.

2. Description of the Related Art

As wireless communication system technology advances, a legacy system and a new system coexist in some cases. In this case, capability between the legacy system and the new system is in question. For example, an Institute of Electrical and Electronics Engineers (IEEE) 802.16e system, which is one type of IEEE 802.16 system, still exists, and improvement of the legacy 16e system performance is under way.

As an example of a method to enhance the performance of the 16e system, Hybrid Automatic Repeat reQuest (HARQ) is applied to uplink management messages. When HARQ is applied to the uplink management messages, the coverage can be extended and thus the system can support users in a wider area. While a current standard of the 16e system partially supports HARQ, HARQ is not supported for RaNGing-REQuest (RNG-REQ) and Bandwidth Request Header (BRH) transmitted after a terminal transmits a ranging code.

When the terminal is not allocated resources from a base station, the terminal transmits a certain ranging code to request the resource allocation. Terminals arbitrarily select their ranging code. Because the terminals may select the same ranging code by chance, collision may take place. Hence, after a certain time, a certain ranging code is selected and transmitted again. The base station successfully receiving the certain ranging code cannot identify which terminal transmits the ranging code. Instead of general resource allocation information, the base station allocates the resource using a MAP Information Element (IE) called Code Division Multiple Access (CDMA)_Allocation_IE. A general resource allocation MAP includes an IDentifier (ID) representing the terminal to receive the MAP, the amount of allocated resources, and the allocation location. By contrast, the CDMA_Allocation_IE identifies the terminal with an index of the received ranging code and a frame number of the location of the received ranging code, and includes the resource amount allocated to the identified terminal and the allocation location information.

Since the HARQ applied to the resource allocated with the CDMA_Allocation_IE is not supported currently, the CDMA_Allocation_IE does not include the HARQ related information. However, when a format of the CDMA_Allocation_IE is changed to apply the HARQ to the resource allocated with the CDMA_Allocation_IE, the capability with the existing terminals is lost.

SUMMARY OF THE INVENTION

Aspects of the present invention are to address at least the above-mentioned problems and/or disadvantages and to provide at least the advantages described below. Accordingly, an aspect of the present invention is to provide an apparatus and a method for supporting Hybrid Automatic Repeat reQuest (HARQ) for an anonymously allocated bandwidth in a broadband wireless communication system.

Another aspect of the present invention is to provide an apparatus and a method for identifying a terminal capable of supporting HARQ for an anonymously allocated bandwidth in a broadband wireless communication system.

Yet another aspect of the present invention is to provide an apparatus and a method for classifying and managing ranging codes into ranging codes defined for resource allocation with HARQ applied, and ranging codes defined for resource allocation without HARQ in a broadband wireless communication system.

In accordance with an aspect of the present invention, a method of operating a terminal in a broadband wireless communication system is provided. The method includes obtaining information of a first ranging code set, which includes ranging codes informing of retransmission support, from a message received from a base station, to inform that retransmission is possible for ranging and to request a resource for the ranging, transmitting a ranging code of the first ranging code set, receiving a resource allocation message including anonymous resource allocation information, and transmitting a ranging request message or a bandwidth request header according to the resource allocation information.

In accordance with another aspect of the present invention, a method of operating a base station in a broadband wireless communication system is provided. The method includes transmitting, to at least one terminal, a message including information of a first ranging code set which includes ranging codes informing of retransmission support, when detecting a ranging code of the first ranging code set in a ranging channel, recognizing that a terminal transmitting the ranging code of the first ranging code set is able to retransmit for ranging, and transmitting a resource allocation message including anonymous resource allocation information which allocates a resource for the ranging to the terminal.

In accordance with yet another aspect of the present invention, an apparatus for operating a terminal in a broadband wireless communication system is provided. The apparatus includes a controller for obtaining information of a first ranging code set which includes ranging codes informing of retransmission support, from a message received from a base station, and a modem for, to inform that retransmission is possible for ranging and to request a resource for the ranging, transmitting a ranging code of the first ranging code set, receiving a resource allocation message including anonymous resource allocation information, and transmitting a ranging request message or a bandwidth request header according to the resource allocation information.

In accordance with still another aspect of the present invention, an apparatus of operating a base station in a broadband wireless communication system is provided. The apparatus includes a modem for transmitting, to at least one terminal, a message including information of a first ranging code set which includes ranging codes informing of retransmission support, and a controller for, when detecting a ranging code of the first ranging code set in a ranging channel, recognizing that a terminal transmitting the ranging code of the first ranging code set is able to retransmit for ranging. The modem transmits a resource allocation message including anonymous resource allocation information which allocates a resource for the ranging to the terminal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will become more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

Figure 1:
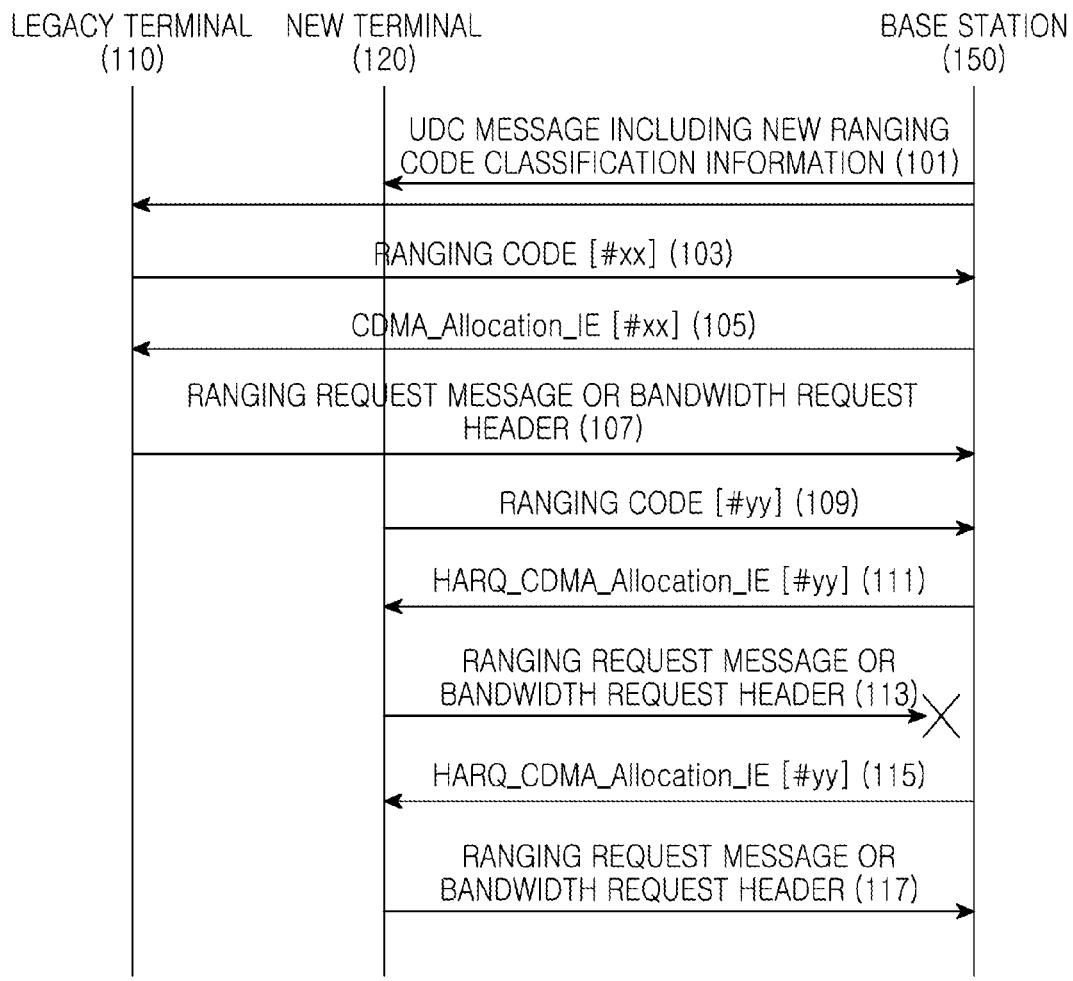
FIG. 1 illustrates a signaling process for allocating an anonymous bandwidth in a broadband wireless communication system according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for purposes of illustration only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Exemplary embodiments of the present invention provide a technique for supporting various system bandwidths in a broadband wireless communication system. Hereinafter, an Orthogonal Frequency Division Multiplexing (OFDM)/Orthogonal Frequency Division Multiple Access (OFDMA) wireless communication system is explained by way of example. However, it is to be understood that this in no way limits application of the present invention to other types of communication systems.

The system according to an exemplary embodiment of the present invention applies Hybrid Automatic Repeat reQuest (HARQ) to anonymously allocated resources. Concurrently, to support legacy terminals which cannot support HARQ in the anonymously allocated resources, the system also operates without HARQ.

To request the anonymously allocated resource, the terminal selectively transmits one code of predefined orthogonal codes or of a set of quasi-orthogonal codes. The code is referred to as a ranging code. Since the ranging code is transmitted over a predefined channel, a base station can detect the ranging code received over the channel. However, the base station cannot identify the terminal which transmits the ranging code. Thus, the base station allocates a resource to the terminal using a message indicating the terminal which transmits the ranging code, with a detection time of the ranging code and an index of the ranging code. That is, the base station anonymously allocates the resource.

In the system according to an exemplary embodiment of the present invention, the selectable ranging codes are divided into ranging codes defined for the resource allocation with HARQ, and ranging codes defined for the resource allocation without HARQ. To ease the understanding, the ranging codes defined for the resource allocation with HARQ are referred to as HARQ support ranging codes, and the ranging codes defined for the resource allocation without HARQ are referred to as HARQ non-support ranging codes. That is, the system defines some of the ranging codes to request the resource with HARQ applied, and other ranging codes to request the resource without HARQ. Accordingly, the terminal supporting HARQ selects one of the HARQ support ranging codes, and the terminal not supporting HARQ selects one of the HARQ non-support ranging codes. Based on the detected ranging code, the base station can determine whether the terminal transmitting the ranging code is capable of supporting HARQ.

The classification information of the ranging codes according to whether HARQ is applied is predefined and stored by the base station and the terminals, or can be transmitted from the base station to the terminals using a separate broadcast message. For example, the broadcast message can employ an Uplink Channel Description (UCD) message. The broadcast message can include information of Table 1 and Table 2.

TABLE 1

| Name | Type (1 byte) | Length | Value |
|---|---|---|---|
| Start of ranging codes group | 155 | 1 | Indicates the starting number, S, of the group of codes used for this UL. If not specified, the default value shall be set to zero. All the ranging codes used on this UL shall be between S and ((S + O + N + M + L) mod 256) where N is the number of initial ranging codes, M is the number of periodic ranging codes, L is the number of BR codes, and O is the number of HO ranging codes. The range of values is 0 = S = 255. |
| Handover Ranging Codes | 194 | 1 | Number of HO ranging CDMA codes. Possible values are 0-255. |
| Initial ranging codes | 150 | 1 | Number of initial ranging CDMA codes. Possible values are 0-255. |
| Periodic ranging codes | 151 | 1 | Number of periodic ranging CDMA codes. Possible values are 0-255. |
| Bandwidth request codes | 152 | 1 | Number of BR codes. Possible values are 0-255. |

TABLE 2

| Name | Type (1 byte) | Length | Value |
|---|---|---|---|
| Handover Ranging Codes for HARQ_CDMA_allcoation | 219 | 1 | Number of HO ranging CDMA codes. After receiving the codes, BS allocates uplink resources through HARQ_CDMA_allocation_IE. Possible values are 0-255. |
| Initial ranging codes for HARQ_CDMA_allcoation | 220 | 1 | Number of initial ranging CDMA codes. After receiving the codes, BS allocates uplink resources through HARQ_CDMA_allocation_IE. Possible values are 0-255. |
| Periodic ranging codes for HARQ_CDMA_allcoation | 221 | 1 | Number of periodic ranging CDMA codes. After receiving the codes, BS allocates uplink resources through HARQ_CDMA_allocation_IE. Possible values are 0-255. |
| Bandwidth request codes for HARQ_CDMA_allcoation | 222 | 1 | Number of BR codes. After receiving the codes, BS allocates uplink resources through HARQ_CDMA_allocation_IE. Possible values are 0-255. |

Table 1 arranges the ranging code classification information for the HARQ non-support ranging codes, and Table 2 arranges the ranging code classification information for the HARQ support ranging codes. In Table 1 and Table 2, an allocation range of the ranging code for each purpose is represented as the number of ranging codes, which implies that the predefined number of ranging codes are allocated for the respective purposes in order of the code index based on the arrangement order of the purposes. In so doing, the ranging codes for the resource allocation with HARQ can be newly defined out of the range of the existing ranging codes allocated for a specific purpose. That is, to include the existing ranging codes not allocated to any purpose, or defined by dividing some of the existing ranging codes allocated for a specific purpose. While the allocation range of the ranging codes is represented with the number of ranging codes in Table 1 and Table 2, the allocation range of the ranging codes can be explicitly defined using the index of the code.

FIG. 1 illustrates a signaling process for allocating an anonymous bandwidth in a broadband wireless communication system according to an exemplary embodiment of the present invention.

Referring to FIG. 1, a legacy terminal 110 and a new terminal 120 receive from a base station 150 a broadcast message including the ranging code classification information for the HARQ non-support ranging codes and the ranging code classification information for the HARQ support ranging codes in step 101. For example, the ranging code classification information for the HARQ support ranging codes can include the number of the HARQ support ranging codes. In an exemplary implementation, the broadcast message can be a UCD message. The broadcast message can include the ranging code classification information of Table 2 as the information for the terminal with HARQ applied when data is transmitted over the resource allocated after the ranging code is transmitted.

The legacy terminal 110 selects and transmits one ranging code according to the ranging purpose based on the HARQ non-support ranging code classification information in step 103. For instance, the HARQ non-support ranging code classification information can be constituted as shown in Table 1. Herein, the ranging purpose can include handover ranging, initial ranging, periodic ranging, bandwidth ranging, and so on. In FIG. 1, the index of the ranging code transmitted by the legacy terminal 110 is expressed as '#xx' to ease the understanding.

The base station 150 receiving the ranging code from the legacy terminal 110 confirms that the ranging code is '#xx' which is one of the HARQ non-support ranging codes, determines the transmission from the terminal which does not support HARQ for the anonymously allocated resource, and allocates the uplink resource by transmitting the CDMA_Allocation_IE not including the HARQ related information in step 105.

The legacy terminal 110 transmits a RaNGing-REQuest (RNG-REQ) or a Bandwidth Request Header (BRH) according to the ranging purpose in step 107.

The new terminal 120 supporting HARQ for the anonymously allocated resource selects and transmits one ranging code according to the ranging purpose based on the HARQ support ranging code classification information in step 109. For instance, the HARQ support ranging code classification information can be constituted as shown in Table 2. Herein, the ranging purpose can include handover ranging, initial ranging, periodic ranging, bandwidth ranging, and so on. In FIG. 1, the index of the ranging code transmitted by the new terminal 120 is expressed as '#yy' to ease the understanding.

The base station 150 receiving the ranging code from the new terminal 120 confirms that the ranging code index is '#yy' which is one of the HARQ support ranging codes, determines the transmission from the terminal which supports HARQ for the anonymously allocated resource, and allocates the uplink resource by transmitting a HARQ_CDMA_Allocation_IE including the HARQ related information in step 111. For example, the HARQ_CDMA_Allocation_IE including the HARQ related information includes parameters of Table 3.

TABLE 3

| Syntax | Size(bit) | Notes |
|---|---|---|
| HARQ_CDMA_Allocation_IE( ) | — | — |
| { | | |
|    CID | 16 | 0x0000 (Ranging CID) |
|    UIUC | 4 | 0xB (To indicate Extended-2 UIUC) |
|    Extended-2 UIUC | 4 | 0x5 (To indicate Extended-3 UIUC) |
|    Length | 8 | 0x07 |
|    Extended-3 UIUC | 4 | 0x0 (To indicate HARQ_CDMA_Allocation_IE) |
|    Duration | 6 | — |
|    UIUC | 4 | UIUC for transmission |
|    Repetition Coding Indication | 2 | 0b00: No repetition coding<br>0b01: Repetition coding of 2 used<br>0b10: Repetition coding of 4 used<br>0b11: Repetition coding of 6 used |
|    Frame Number Index | 8 | LSBs of relevant frame number |
|    Ranging Code | 8 | — |
|    Ranging Symbol | 8 | — |
|    Ranging subchannel | 7 | — |
|    BW request mandatory | 1 | 1: Yes, 0: No |
|    ACID | 4 | — |
|    AI_SN | 1 | — |
|    ACK disable | 1 | When ACK Disable == 1, the allocated subburst does not require an ACK to be transmitted by the BS in the HARQ ACK BITMAP (see 8.4.5.3.22). In this case, no bit position is allocated for the subburst in the HARQ ACK BITMAP. For TDD SS, for the burst, MS shall not perform HARQ retransmission and ignore ACID and AI_SN, which shall be set to 0 by BS if they exist. The CRC shall be appended at the end of each subburst regardless of the ACK disable bit. |
|    Reserved | 2 | — |
| } | | |

In Table 3, the Frame Number Index field is the value indicating a frame of the corresponding ranging code received. In a retransmission according to HARQ, the frame range indicated by the Frame Number Index field can be wider than the initial transmission. Thus, the Frame Number Index field has 8 bits in size, which is greater than the conventional CDMA_Allocation_IE not including the HARQ related information. The Arq Channel IDentifier (ACID) field is a value for distinguishing a plurality of HARQ channels operated by the terminal, the Arq Identifier Sequence Number (AI_SN) field is a toggle value to indicate when HARQ packets are successfully received over the same HARQ channel, and the ACK disable field indicates whether to feed back ACKnowledge/Non-ACK (ACK/NACK) which explicitly informs of the reception success or failure. In Table 3, a Chase Combining (CC) scheme is assumed as the HARQ basic operation scheme. When an Incremental Redundancy (IR) scheme is adopted, a SubPacket ID (SPID) field indicating a subpacket version can be added.

The new terminal 120 stores the HARQ related information of the HARQ_CDMA_Allocation_IE, and transmits the RNG-REQ message or the BRH according to the ranging purpose in step 113. In so doing, the new terminal 120 can adopt separate channel coding to apply the HARQ. For the retransmission, the new terminal 120 stores the RNG-REQ message or the BRH. Yet, the base station 150 may fail to receive the RNG-REQ message or the BRH.

Accordingly, the base station 150 retransmits the HARQ_CDMA_Allocation_IE in step 115. In more detail, the base station 150 reallocates the resource due to the reception failure of the RNG-REQ message or the BRH so that the new terminal 120 retransmits the RNG-REQ message or the BRH. Alternatively, the NACK message explicitly informing of the reception failure of the RNG-REQ message or the BRH can be transmitted, which is not depicted in FIG. 1.

Next, the new terminal 120 retransmits the RNG-REQ message or the BRH according to the ranging purpose, and the base station 150 successfully receives the RNG-REQ message or the BRH from the new terminal 120 in step 117.

In the exemplary embodiment of FIG. 1, the base station 150 receiving the HARQ support ranging code transmits a resource allocation message including the HARQ related information of Table 3. Alternatively, the base station 150 can transmit the resource allocation message not including the HARQ related information. To reduce the signaling overhead, the base station 150 can leave out the HARQ related information.

In FIG. 1, when the plurality of terminals supporting HARQ for the anonymously allocated resource transmit the ranging codes, the HARQ_CDMA_Allocation_IEs including the HARQ related information need to be transmitted. To reduce the signaling overhead, exemplary embodiments of the present invention provide a method for allocating the resources to the plurality of terminals using the single HARQ_CDMA_Allocation_IE. More specifically, when the terminals each transmit the ranging codes, the base station allocates the resources to the terminals which transmit the ranging code in the same frame using the single HARQ_CDMA_Allocation_IE. Alternatively, the base station can allocate the resources to the terminals using the single HARQ_CDMA_Allocation_IE regardless of the frame carrying the ranging codes. Hereafter, an exemplary method for allocating the resources to the terminals which transmit the ranging codes in the same frame using the single HARQ_CDMA_Allocation_IE is explained by referring to the drawing.

Figure 2:
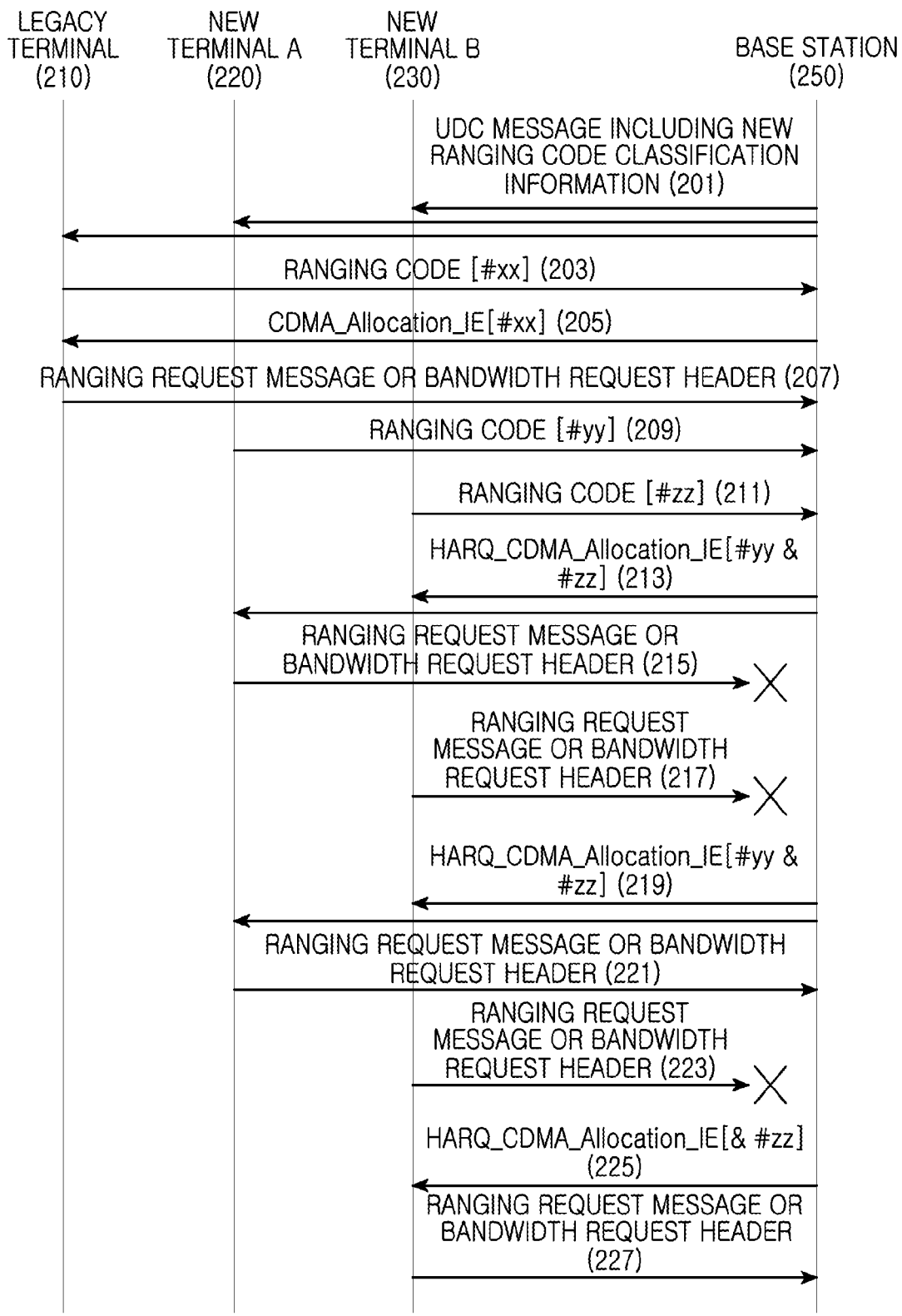
FIG. 2 illustrates a signaling process for allocating an anonymous bandwidth in a broadband wireless communication system according to an exemplary embodiment of the present invention.

FIG. 2 illustrates a signaling process for allocating an anonymous bandwidth in a broadband wireless communication system according to an exemplary embodiment of the present invention.

Referring to FIG. 2, a legacy terminal 210, a new terminal A 220, and a new terminal B 230 receive, from a base station 250, a broadcast message including the ranging code classification information for the HARQ non-support ranging codes and the ranging code classification information for the HARQ support ranging codes in step 201. For example, the ranging code classification information for the HARQ support ranging codes can include the number of HARQ support ranging codes. For example, the broadcast message can be a UCD message. The broadcast message can include the ranging code classification information of Table 2 as the information for the terminal which applies HARQ when data is transmitted over the resource allocated after the ranging code is transmitted.

The legacy terminal 210 selects and transmits one ranging code according to the ranging purpose based on the HARQ non-support ranging code classification information in step 203. For instance, the HARQ non-support ranging code classification information can be constituted as shown in Table 1. Herein, the ranging purpose can include handover ranging, initial ranging, periodic ranging, bandwidth ranging, and so on. In FIG. 2, the index of the ranging code transmitted by the legacy terminal 210 is expressed as '#xx' to ease the understanding.

The base station 250 receiving the ranging code from the legacy terminal 210 confirms that the ranging code is '#xx' which is one of the HARQ non-support ranging codes, determines the transmission from the terminal which does not support HARQ for the anonymously allocated resource, and allocates the uplink resource by transmitting the CDMA_Allocation_IE not including the HARQ related information in step 205.

The legacy terminal 210 transmits the RNG-REQ message or the BRH according to the ranging purpose in step 207.

The new terminal A 220 supporting HARQ for the anonymously allocated resource selects and transmits one ranging code according to the ranging purpose based on the HARQ support ranging code classification information in step 209. For instance, the HARQ support ranging code classification information can be constituted as shown in Table 2. Herein, the ranging purpose can include handover ranging, initial ranging, periodic ranging, bandwidth ranging, and so on. In FIG. 2, the index of the ranging code transmitted by the new terminal A 220 is expressed as '#yy' to ease the understanding.

In the frame carrying the ranging code of the new terminal A 220, the new terminal B 230 supporting HARQ for the anonymously allocated resource selects and transmits one ranging code according to the ranging purpose based on the information of Table 2 in step 211. Herein, the ranging purpose can include the handover ranging, the initial ranging, the periodic ranging, and the bandwidth ranging. In FIG. 2, the index of the ranging code transmitted by the new terminal B 230 is expressed as '#zz' to ease the understanding.

The base station 250 receiving the ranging codes from the new terminal A 220 and the new terminal B 230 confirms that the ranging code indexes are '#yy' and '#zz' belonging to the HARQ support ranging codes, determines the transmission from the terminals which support the HARQ for the anonymously allocated resource, and allocates the uplink resources by transmitting the HARQ_CDMA_Allocation_IE including the HARQ related information in step 213. Herein, the HARQ_CDMA_Allocation_IE includes the resource allocation information for both of the new terminal A 220 and the new terminal B 230. For example, the HARQ_CDMA_Allocation_IE including the HARQ related information includes parameters of Table 4.

TABLE 4

| Syntax | Size (bit) | Notes |
|---|---|---|
| HARQ_CDMA_Allocation_IE( ) | — | — |
| { | | |
|     CID | 16 | 0x0000 (Ranging CID) |
|     UIUC | 4 | 0xB (Extended-2 UIUC) |
|     Extended-2 UIUC | 4 | 0x5 (Extended-3 UIUC) |
|     Length | 8 | Variable |
|     Extended-3 UIUC | 4 | 0x0 (HARQ_CDMA_Allocation_IE) |
|     Frame Number Index | 8 | LSBs of relevant frame number |

TABLE 4-continued

| Syntax | Size (bit) | Notes |
|---|---|---|
| Ranging Symbol | 8 | Indicates the OFDMA symbol used by the SS |
| Ranging subchannel | 7 | Identifies the ranging subchannel used by the SS to send the CDMA code |
| Reserved | 1 | — |
| OFDMA Symbol offset | 8 | This value indicates start Symbol offset of subsequent subbursts in this HARQ_CDMA_Allocation_IE with reference to the start of the UL subframe |
| Subchannel offset | 7 | This value indicates start Subchannel offset of subsequent subbursts in this HARQ_CDMA_Allocation_IE |
| N subbursts | 5 | Number of subbursts in this HARQ UL MAP IE is this field value plus 1. The value is identical with the number of received ranging codes on the above ranging opportunity. |
| For (i=0; i< N subbursts; i++) { | — | — |
| Ranging Code | 8 | Index of received ranging code |
| UIUC | 4 | — |
| Repetition Coding Indication | 2 | 0b00: No repetition coding<br>0b01: Repetition coding of 2 used<br>0b10: Repetition coding of 4 used<br>0b11: Repetition coding of 6 used |
| Duration | 10 | — |
| ACID | 4 | — |
| AI_SN | 1 | — |
| ACK disable | 1 | When ACK Disable == 1, the allocated subburst does not require an ACK to be transmitted by the BS in the HARQ ACK BITMAP (see 8.4.5.3.22). In this case, no bit position is allocated for the subburst in the HARQ ACK BITMAP. For TDD SS, for the burst, MS shall not perform HARQ retransmission and ignore ACID and AI_SN, which shall be set to 0 by BS if they exist. The CRC shall be appended at the end of each subburst regardless of the ACK disable bit. |
| Reserved } } | 2 | — |

In Table 4, the Frame Number Index field is the value indicating the frame of the corresponding ranging code received. In the retransmission according to HARQ, the frame range indicated by the Frame Number Index field can be wider than the initial transmission. Thus, the Frame Number Index field has 8 bits in size, which is greater than the conventional CDMA_Allocation_IE not including the HARQ related information. The ACID field is a value for distinguishing the HARQ channels operated by the terminal, the AI_SN field is a toggle value to indicate when HARQ packets are successfully received over the same HARQ channel, and the ACK disable field indicates whether to feed back the ACK/NACK which explicitly informs of the reception success or failure. In Table 4, the CC scheme is assumed as the HARQ basic operation scheme. When the IR scheme is adopted, the SPID field indicating the subpacket version can be added.

The new terminal A 220 stores the HARQ related information of the HARQ_CDMA_Allocation_IE, and transmits the RNG-REQ message or the BRH according to the ranging purpose in step 215. The new terminal B 230 stores the HARQ related information of the HARQ_CDMA_Allocation_IE and transmits the RNG-REQ message or the BRH according to the ranging purpose in step 217. At this time, the new terminal A 220 and the new terminal B 230 can adopt separate channel coding to apply HARQ. For the retransmission, the new terminal A 220 and the new terminal B 230 store the RNG-REQ message or the BRH.

Yet, the base station 250 fails to receive the RNG-REQ message or the BRH from both of the new terminal A 220 and the new terminal B 230.

Accordingly, the base station 250 retransmits the HARQ_CDMA_Allocation_IE in step 219. In more detail, the base station 250 reallocates the resources due to the reception failure of the RNG-REQ message or the BRH so that the new terminal A 220 and the new terminal B 230 retransmit the RNG-REQ message or the BRH. Alternatively, the NACK message explicitly informing of the reception failure of the RNG-REQ message or the BRH can be transmitted.

The new terminal A 220 retransmits the RNG-REQ message or the BRH according to the ranging purpose in step 221, and the new terminal B 230 retransmits the RNG-REQ message or the BRH according to the ranging purpose in step 223. The base station 250 successfully receives the RNG-REQ message or the BRH from the new terminal A 220 but fails to receive the RNG-REQ message or the BRH from the new terminal B 230.

Hence, the base station 250 transmits the HARQ_CDMA_Allocation_IE to allocate the resource to the new terminal B 230 in step 225. Alternatively, the NACK message explicitly informing of the reception failure of the RNG-REQ message or the BRH can be transmitted to the new terminal B 230, which is not depicted in FIG. 2. Alternatively, the ACK message explicitly informing of the reception success of the RNG-REQ message or the BRH can be transmitted to the new terminal A 220, which is not depicted in FIG. 2.

The new terminal B 230 retransmits the RNG-REQ message or the BRH according to the ranging purpose, and the base station 250 successfully receives the RNG-REQ message or the BRH from the new terminal B 230 in step 227.

In the exemplary embodiment of FIG. 2, the base station 250 receiving the HARQ support ranging code transmits the resource allocation message including the HARQ related information of Table 4. Alternatively, the base station 250 can transmit the resource allocation message not including the HARQ related information. To reduce the signaling overhead, the base station 250 can exclude the HARQ related information.

Now, exemplary operations and structures of a terminal for requesting an anonymously allocated resource and a base station for allocating a resource are elucidated by referring to the drawings.

Figure 3:
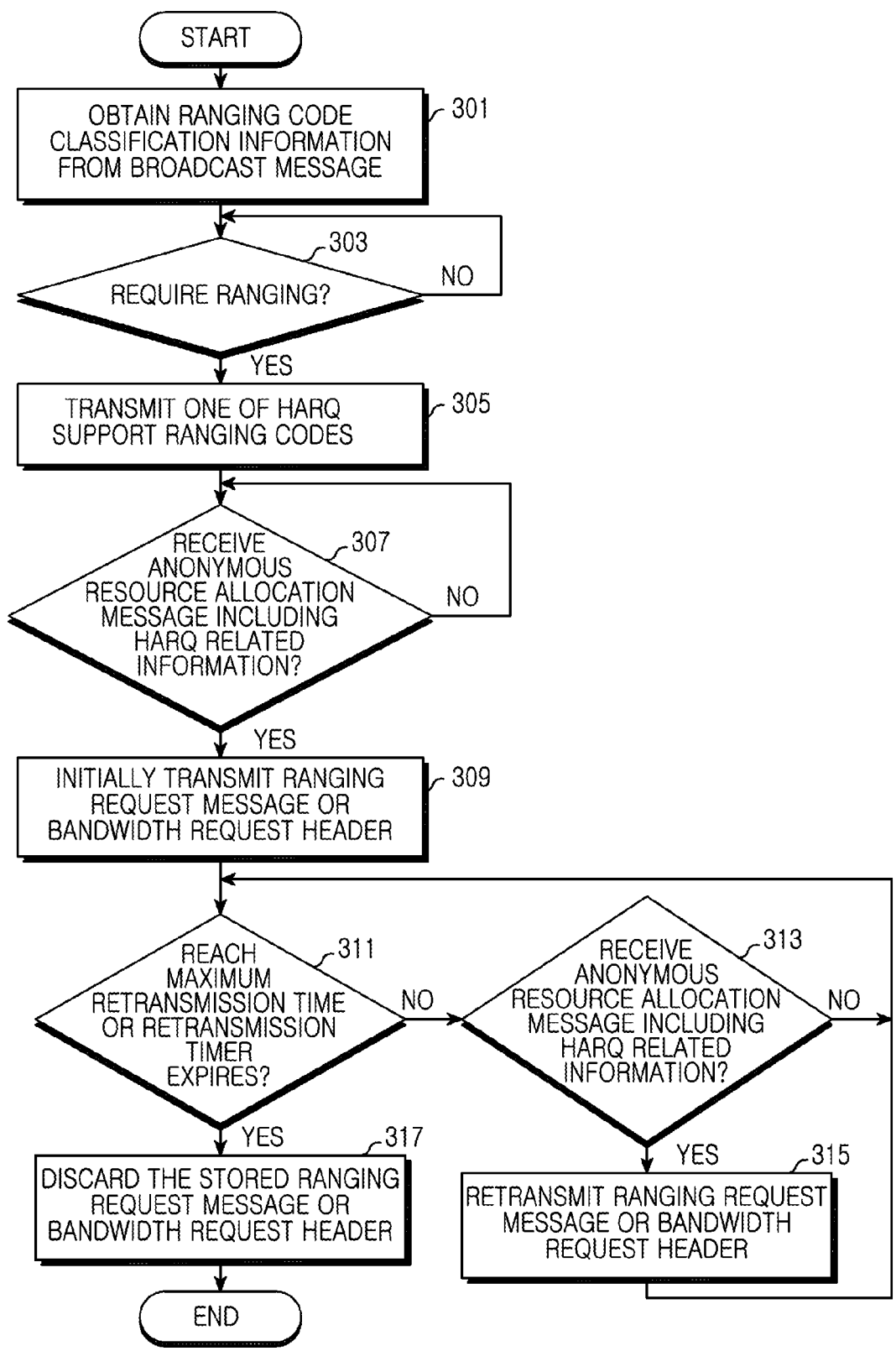
FIG. 3 illustrates operations of a terminal in a broadband wireless communication system according to an exemplary embodiment of the present invention.

FIG. 3 illustrates operations of a terminal in a broadband wireless communication system according to an exemplary embodiment of the present invention.

Referring to FIG. 3, the terminal obtains the ranging code classification information from the message broadcast by the base station in step 301. The ranging code classification information includes the classification information of the HARQ support ranging codes and the classification information of the HARQ non-support ranging codes. Herein, the HARQ support ranging codes indicate the ranging codes informing of the support of the retransmission, and can be referred to as a first ranging code set. For example, the broadcast message can be a UCD message, and the ranging code classification information can contain the number of the HARQ support ranging codes. For example, ranging code classification information can be constituted as shown in Table 1 and Table 2. In Table 1 and Table 2, the allocation range of each ranging code is represented as the number of the ranging codes. Alternatively, the allocation range of the ranging code can be explicitly defined using the index of the code.

In step 303, the terminal determines whether ranging is necessary. For example, the terminal determines whether initial ranging, handover ranging, periodic ranging, or uplink resource allocation is needed.

When ranging is required, the terminal selects and transmits one of the HARQ support ranging codes in step 305. That is, by transmitting one of the HARQ support ranging codes, the terminal informs that the retransmission is possible for ranging and requests a resource for ranging. More specifically, the terminal generates a complex symbol sequence by modulating the selected ranging code, maps the complex symbol sequence to an uplink ranging channel, generates OFDM symbols through Inverse Fast Fourier Transform (IFFT) and Cyclic Prefix (CP) insertion, and transmits the OFDM symbols.

In step 307, the terminal determines whether an anonymous resource allocation message including the HARQ related information is received. That is, the terminal receives the resource allocation message indicating the target of the resource allocation using the transmission location of the ranging code transmitted in step 305 and the index of the ranging code. For instance, the anonymous resource allocation message can be a HARQ_CDMA_Allocation_IE, and the HARQ related information may include information informing of the purpose of the HARQ application and information required for the HARQ operation, for example, includes at least one of the ACID, the AI_SN, the SPID, and the ACK disable. For example, the HARQ_CDMA_Allocation_IE can be constituted as shown in Table 3 or Table 4.

Upon receiving the anonymous resource allocation message including the HARQ related information, the terminal initially transmits the RNG-REQ message or the BRH according to the purpose of the ranging as determined in step 303, in step 309. After the initial transmission, the terminal stores, rather than discarding, the RNG-REQ message or the BRH for the sake of the retransmission.

In step 311, the terminal determines whether a maximum retransmission number is reached or a retransmission timer expires. Herein, the retransmission timer, which is used to determine a maximum time interval between the HARQ retransmission, starts at the point of HARQ transmission and expires when the maximum time interval elapses.

When the maximum retransmission number is not reached or the retransmission timer does not expire, the terminal determines whether the anonymous resource allocation message including the HARQ related information is received again in step 313. That is, the terminal determines whether the base station requests the retransmission of the RNG-REQ message or the BRH.

Receiving the anonymous resource allocation message including the HARQ related information, the terminal retransmits the RNG-REQ message or the BRH in step 315. A format of the retransmitted RNG-REQ message or BRH can vary according to the HARQ scheme. In conformity with the CC scheme, the retransmitted RNG-REQ message or BRH is the same as the RNG-REQ message or BRH initially transmitted in step 309. In conformity with the IR scheme, the retransmitted RNG-REQ message or BRH is the subpacket of the different version from the RNG-REQ message or BRH initially transmitted in step 309. Next, by repeating steps 311 and 313, the terminal determines whether the maximum retransmission number is reached or the retransmission timer expires, or whether the anonymous resource allocation message including the HARQ related information is received.

When the maximum retransmission number is reached or the retransmission timer expires, the terminal determines the successful transmission of the RNG-REQ message or the BRH and discards the RNG-REQ message or the BRH in step 317.

The exemplary method of the terminal illustrated in FIG. 3 includes the obtaining of the ranging code classification information, the transmitting of the ranging code, the receiving of the resource allocation message, and the transmitting of the RNG-REQ message or the BRH. In an exemplary implementation, the method can include only some of the illustrated steps. For example, the method can merely include the obtaining of the ranging code classification information and the transmitting of the ranging code.

Figure 4:
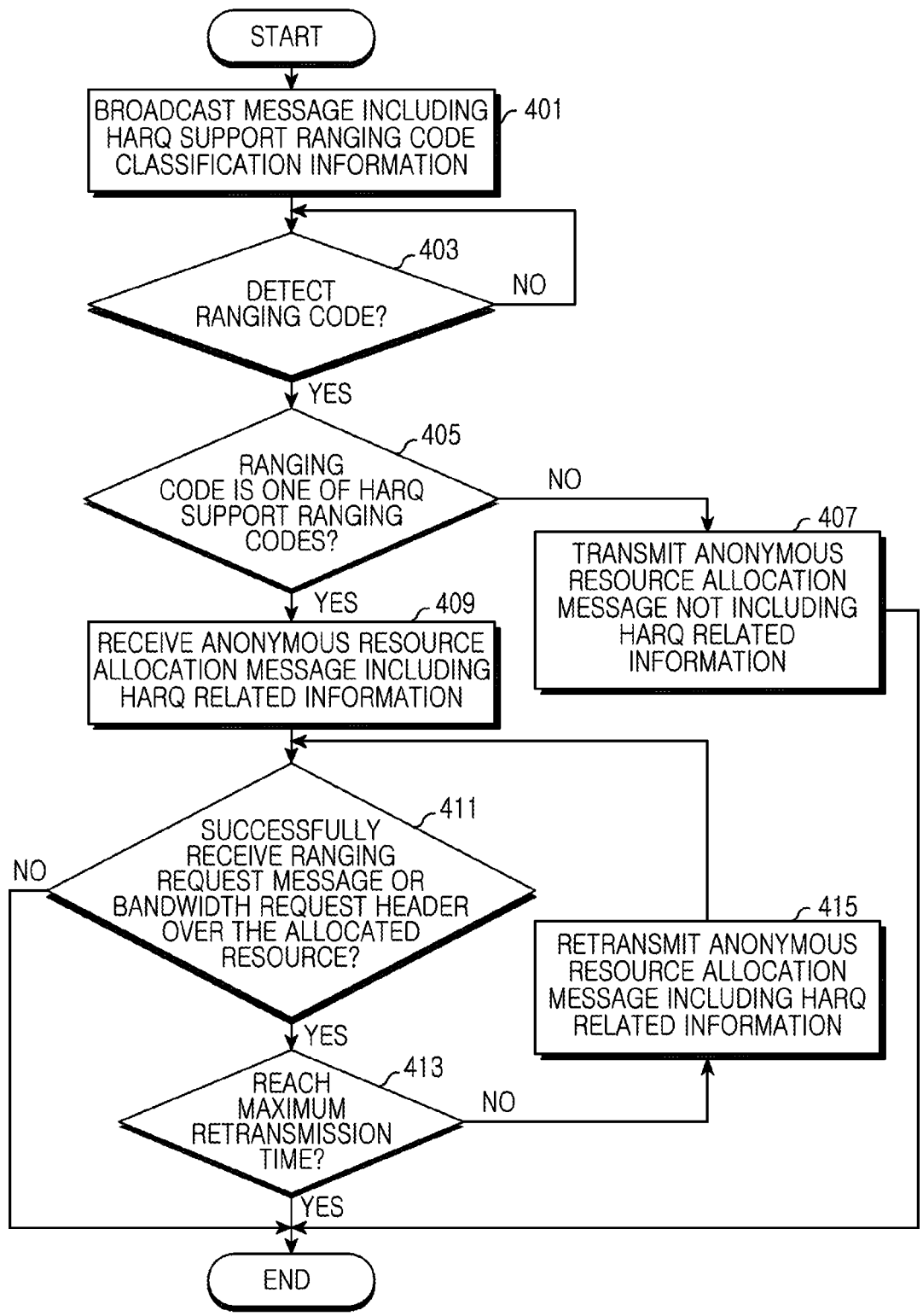
FIG. 4 illustrates operations of a base station in a broadband wireless communication system according to an exemplary embodiment of the present invention.

FIG. 4 illustrates operations of a base station in a broadband wireless communication system according to an exemplary embodiment of the present invention.

Referring to FIG. 4, the base station broadcasts a message including classification information of the HARQ support ranging codes in step 401. Herein, the HARQ support ranging codes indicate the ranging codes informing of the support of the retransmission, and can be referred to as the first ranging code set. The message also includes the classification information of the HARQ non-support ranging codes. For example, the broadcast message can be a UCD message, and the ranging code classification information can contain the number of the HARQ support ranging codes. For example, the ranging code classification information can be constituted as shown in Table 1 and Table 2. In Table 1 and Table 2, the allocation range of each ranging code is represented as the number of the ranging codes. Alternatively, the allocation range of the ranging code can be explicitly defined using the index of the code.

In step 403, the base station determines whether the ranging code is detected. That is, the base station detects the ranging code transmitted from the terminal by correlating the signal received over the ranging channel and the ranging codes respectively. In so doing, the plurality of the ranging codes can be detected.

Upon detecting the ranging code, the base station determines whether the detected ranging code is one of the HARQ support ranging codes in step 405. When the multiple ranging codes are detected, the base station determines whether each of the detected ranging codes is one of the HARQ support ranging codes.

When the detected ranging code is not one of the HARQ support ranging codes, that is, when the detected ranging code is one of the HARQ non-support ranging codes, the base station determines that the terminal transmitting the ranging code does not support HARQ for the anonymously allocated resource, and transmits the anonymous resource allocation message not including the HARQ related information in step 407. At this time, when detecting the plurality of the HARQ non-support ranging codes, the base station transmits a plurality of the anonymous resource allocation messages corresponding to the ranging codes respectively.

By contrast, when the detected ranging code is one of the HARQ support ranging codes, the base station determines that the terminal transmitting the ranging code supports the HARQ for the anonymously allocated resource, and transmits the anonymous resource allocation message including the HARQ related information in step 409. At this time, the anonymous resource allocation message can be the HARQ_CDMA_Allocation_IE, and the HARQ related information includes the information informing of the purpose of the HARQ application and the information required for the HARQ operation, for example, includes at least one of the ACID, the AI_SN, the SPID, and the ACK disable. For example, the HARQ_CDMA_Allocation_IE can be constituted as shown in Table 3 or Table 4. When detecting the plurality of the HARQ support ranging codes, the base station can transmit a plurality of the anonymous resource allocation messages corresponding to the ranging codes respectively, or transmit one anonymous resource allocation message including the resource allocation information for the ranging codes.

In step 411, the base station determines whether the RNG-REQ message or the BRH is received over the resource allocated by the anonymous resource allocation message. In more detail, the base station attempts to detect the RNG-REQ message or the BRH from the signal received over the allocated resource, and determines whether the detection is successful. Herein, the success or failure of the detection is determined using a Cyclic Redundancy Check (CRC). When detecting the resource allocation information for the multiple ranging codes of the single anonymous resource allocation message, the determination of whether the reception is successful is applied to each ranging code.

When not successfully receiving the RNG-REQ message or the BRH, the base station determines whether it reaches the maximum retransmission number in step 413. When reaching the maximum retransmission number, the base station does not request the HARQ retransmission and finishes this process.

By contrast, when not reaching the maximum retransmission number, the base station retransmits the anonymous resource allocation message including the HARQ related information in step 415. At this time, one anonymous resource allocation message includes the resource allocation information for the multiple ranging codes. When the RNG-REQ message or the BRH corresponding to some ranging codes is not received, the anonymous resource allocation message includes the resource allocation information for some ranging codes.

The exemplary method of the base station illustrated in FIG. 4 includes the providing of the ranging code classification information, the detecting of the ranging code, the transmitting of the resource allocation message, and the receiving of the RNG-REQ message or the BRH. In an exemplary implementation, the method can include only some of the illustrated steps. For example, the method of the base station can merely include the providing of the ranging code classification information and the detecting of the ranging code.

Figure 5:
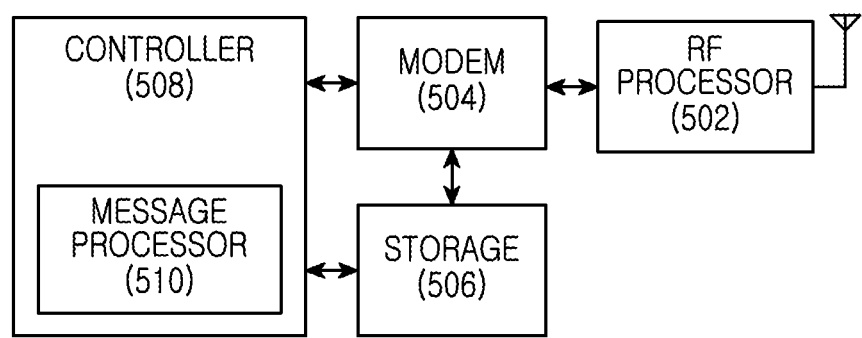
FIG. 5 illustrates a terminal in a broadband wireless communication system according to an exemplary embodiment of the present invention.

FIG. 5 is a block diagram of a terminal in a broadband wireless communication system according to an exemplary embodiment of the present invention.

Referring to FIG. 5, the terminal includes a Radio Frequency (RF) processor 502, a modem 504, a storage 506, and a controller 508.

The RF processor 502 converts the signal band and amplifies the signal to transmit and receive signals over a radio channel. In more detail, the RF processor 502 up-converts a baseband signal output from the modem 504 to an RF signal, transmits the RF signal over an antenna, and down-converts an RF signal received via the antenna to a baseband signal.

The modem 504 converts the baseband signal and the bit sequence according to a physical layer standard of the system. For example, in the data transmission, the modem 504 generates complex symbols by encoding and modulating a transmit bit sequence, maps the complex symbols to subcarriers, and constitutes OFDM symbols through the IFFT and the CP insertion. In the data reception, the modem 504 splits the baseband signal output from the RF processor 502 into OFDM symbols, restores the signals mapped to the subcarriers through FFT, and restores the receive bit sequence using the demodulation and the decoding. When HARQ is applied to the uplink, the modem 504 stores the encoded data to the storage 506 for retransmission. In conformity with the CC scheme, the modem 504 transmits all packets in both of the initial transmission and the retransmission. In conformity with the IR scheme, the modem 504 transmits the subpackets of the different versions in the initial transmission and the retransmission.

The storage 506 stores the encoded packet for the HARQ retransmission and provides the stored packet to the modem 504 in the retransmission. The storage 506 stores configuration information required for the terminal to communicate with the base station. For example, the storage 506 stores the ranging code classification information received from the base station.

The controller 508 controls functions of the terminal. The controller 508 controls the packet retransmission according to HARQ and controls the ranging code transmission for the ranging and the uplink bandwidth request. More particularly, the controller 508 applies HARQ to the anonymously allocated resource by transmitting the ranging code. The operations of the controller 508 for applying HARQ to the anonymously allocated resource by transmitting the ranging code are explained in more detail below.

A message processor 510 of the controller 508 obtains the ranging code classification information from the message broadcast by the base station, and the controller 508 stores the ranging code classification information to the storage 506. The ranging code classification information includes the classification information of the HARQ support ranging codes and the classification information of the HARQ non-support ranging codes. Next, when the ranging is necessary, the controller 508 selects one of the HARQ support ranging codes and transmits the selected ranging code via the modem 504 and the RF processor 502. That is, by transmitting one of the HARQ support ranging codes, the controller 508 informs that the retransmission is possible for ranging and requests the resource for the ranging. Upon receiving the anonymous resource allocation message including the HARQ related information, the message processor 510 generates the RNG-REQ message or the BRH according to the purpose and the controller 508 initially transmits the RNG-REQ message or the BRH. For the retransmission, the modem 504 stores, rather than discarding, the RNG-REQ message or the BRH to the storage 506. When receiving the anonymous resource allocation message before the maximum retransmission number is reached or the retransmission timer expires, the controller 508 controls the modem 504 to retransmit the RNG-REQ message or the BRH in conformity with the CC scheme or the IR scheme. Upon determining the successful transmission of the RNG-REQ message or the BRH, the controller 508 discards the RNG-REQ message or the BRH stored to the storage 506.

Figure 6:
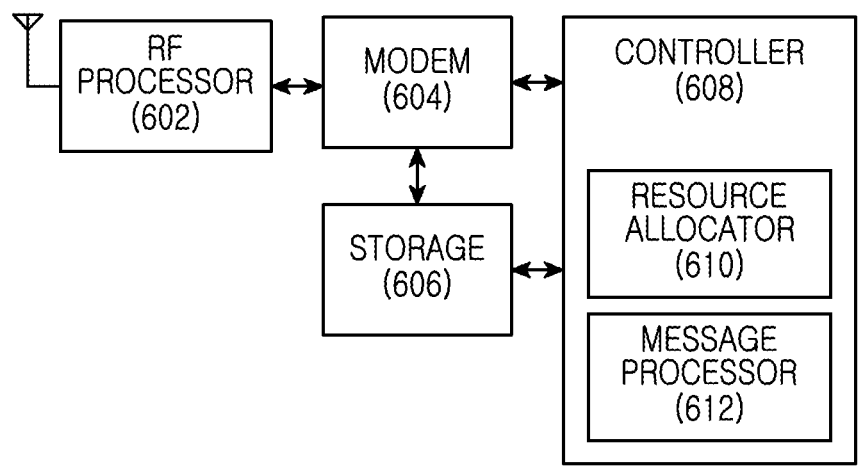
FIG. 6 illustrates a base station in a broadband wireless communication system according to an exemplary embodiment of the present invention.

FIG. 6 is a block diagram of a base station in a broadband wireless communication system according to an exemplary embodiment of the present invention.

Referring to FIG. 6, the base station includes an RF processor 602, a modem 604, a storage 606, and a controller 608.

The RF processor 602 converts the signal band and amplifies the signal to transmit and receive signals over a radio channel. In more detail, the RF processor 602 up-converts a baseband signal output from the modem 604 to an RF signal and transmits the RF signal over an antenna, and down-converts an RF signal received via the antenna to a baseband signal.

The modem 604 converts the baseband signal and the bit sequence according to a physical layer standard of the system. For example, in the data transmission, the modem 604 generates complex symbols by encoding and modulating a transmit bit sequence, maps the complex symbols to subcarriers, and constitutes OFDM symbols through the IFFT and the CP insertion. In the data reception, the modem 604 splits the baseband signal output from the RF processor 602 into OFDM symbols, restores the signals mapped to the subcarriers through FFT, and restores the receive bit sequence using the demodulation and the decoding. When HARQ is applied to the uplink, the modem 604 stores the receive data to the storage 606 so as to combine with the retransmit packet in case of the HARQ packet detection failure. Receiving the retransmitted packet, the modem 504 combines the packet with the data stored to the storage 606 and decodes the combined data.

The storage 606 stores the received HARQ packet when the HARQ packet detection fails, and provides the modem 604 with the stored packet when the retransmission packet is received. The storage 606 stores the configuration information required for the communication.

The controller 608 controls functions of the base station. A resource allocator 610 of the controller 608 allocates the resources to the terminals, and a message processor 612 of the controller 608 generates a message for providing system information to the terminals. More particularly, the controller 608 applies HARQ to the anonymously allocated resource according to the ranging code reception. The operations of the controller 608 for applying HARQ to the anonymously allocated resource according to the ranging code reception are described in more detail below.

The message processor 612 generates the message including the classification information of the HARQ support ranging codes, and the controller 608 broadcasts the message via the modem 604 and the RF processor 602. Next, when the modem 604 detects the ranging code in the ranging channel, the controller 608 determines whether the detected ranging code is one of the HARQ support ranging codes. When the plurality of the ranging codes is detected, the controller 608 determines whether each of the detected ranging codes is one of the HARQ support ranging codes. When the detected ranging code is one of the HARQ support ranging codes, the controller 608 determines that the terminal transmitting the ranging code supports HARQ for the anonymously allocated resource, the resource allocator 610 allocates the resource to the terminal, and the message processor 612 generates the anonymous resource allocation message including the HARQ related information. In so doing, when the plurality of the HARQ support ranging codes is detected, the message processor 612 can generate a plurality of anonymous resource allocation messages corresponding to the respective ranging codes, or one anonymous resource allocation message including the resource allocation information for the ranging codes respectively. Next, when receiving no RNG-REQ message or bandwidth request message over the resource allocated through the anonymous resource allocation message, the controller 608 retransmits the anonymous resource allocation message including the HARQ related information within the maximum retransmission number. At this time, when the single anonymous resource allocation message including the resource allocation information for the multiple ranging codes is transmitted and the RNG-REQ message or the BRH corresponding to some ranging codes is not received, the anonymous resource allocation message includes the resource allocation information for some ranging codes.

As set forth above, in a broadband wireless communication system, the ranging code classification information is provided to the terminals using a separate message and the base station identifies a new terminal according to the type of the ranging code. Thus, the message for enabling the legacy terminal to support the legacy scheme and the new terminal supporting HARQ to support the HARQ function can be transmitted. Consequently, both of the legacy terminal and the new terminal can be supported effectively with less overhead.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for operating a terminal in a wireless communication system, the method comprising:
    identifying a first set of ranging codes and a second set of ranging codes;
    transmitting a ranging code of the first set of ranging codes;
    receiving a message comprising resource allocation information; and
    transmitting a ranging request message using a resource allocated by the resource allocation information,
    wherein a retransmission of the ranging request message is supported if the first set of ranging codes is used and the retransmission of the ranging request is not supported if the second set of ranging codes is used.

2. The method of claim 1, wherein the message comprises an index of the ranging code transmitted from the terminal and a frame index carrying the ranging code transmitted from the terminal.

3. The method of claim 1, wherein the message comprises information on the retransmission,
wherein the information on the retransmission comprises at least one of an Automatic Repeat reQuest (ARQ) channel identifier, an ARQ identifier sequence number, and a value indicating whether to feed back ACKnowledge/Non-ACKnowledge (ACK/NACK).

4. The method of claim 1, wherein the message further comprises resource allocation information and information on retransmission of another terminal, other than the terminal, which transmits a ranging code in a same frame as the terminal.

5. The method of claim 1, further comprising:
receiving a message comprising resource allocation information for the retransmission; and
retransmitting the ranging request message using another resource allocated by the resource allocation information.

6. The method of claim 5, wherein signals transmitted through resources allocated by each of the messages are combined by the base station.

7. The method of claim 1, wherein the message comprises a Code Division Multiple Access (CDMA)_Allocation_Information Element (IE).

8. The method of claim 1, further comprising:
receiving information on the first set of ranging codes and information on the second set of ranging codes.

9. The method of claim 8, wherein the information on the first set of the ranging codes indicates a range of the ranging codes by one of the number of codes and indexes of the codes.

10. A method for operating a base station in a wireless communication system, the method comprising:
transmitting information on a first set of ranging codes and information on a second set of ranging codes;
receiving a ranging code of the first set of ranging codes from a terminal; and
transmitting a message comprising resource allocation information,
wherein a retransmission of the ranging request message is supported if the first set of ranging codes is used and the retransmission of the ranging request message is not supported if the second set of ranging codes is used.

11. The method of claim 10, further comprising:
transmitting a message comprising resource allocation information for retransmission.

12. The method of claim 11, wherein the information on the first set of the ranging codes indicates a range of the ranging codes by one of a number of the codes and indexes of the codes.

13. The method of claim 11, further comprising:
combining signals received through resources allocated by each of the messages.

14. The method of claim 10, wherein the message comprises an index of the ranging code transmitted from the terminal and a frame index carrying the ranging code transmitted from the terminal 15. The method of claim 10, wherein the message comprises information on the retransmission,
wherein the information on the retransmission comprises at least one of an Automatic Repeat reQuest (ARQ) channel identifier, an ARQ identifier sequence number, and a value indicating whether to feed back ACKnowledge/Non-ACKnowledge (ACK/NACK).

16. The method of claim 10, wherein the message further comprises resource allocation information and information on the retransmission of another terminal which transmits a ranging codes in a same frame as the terminal.

17. The method of claim 10, wherein the message comprises a Code Division Multiple Access (CDMA)_Allocation_Information Element (IE).

18. An apparatus for operating a terminal in a wireless communication system, the apparatus comprising:
a controller for identifying a first set of ranging codes and a second set of ranging codes; and
a modem for transmitting a ranging code of the first set of ranging codes, for receiving a message comprising resource allocation information, and for transmitting a ranging request message using a resource allocated by the resource allocation information,
wherein a retransmission of the ranging request message is supported if the first set of ranging codes is used and the retransmission of the ranging request is not supported if the second set of ranging codes is used.

19. The apparatus of claim 18, wherein the message comprises an index of the ranging code transmitted from the terminal and a frame index carrying the ranging code transmitted from the terminal.

20. The apparatus of claim 18, wherein the message comprises information on the retransmission, and
wherein the information on the retransmission comprises at least one of an Automatic Repeat reQuest (ARQ) channel identifier, an ARQ identifier sequence number, and a value indicting whether to feed back ACKnowledge/Non-ACKnowledge (ACK/NACK).

21. The apparatus of claim 20, wherein the message further comprises resource allocation information and information for retransmission of another terminal, other than the terminal, which transmits a ranging code in a same frame as the terminal.

22. The apparatus of claim 18, wherein the modem receives a message comprising resource allocation information for the retransmission, and retransmits the ranging request message using another resource allocated by the resource allocation information.

23. The apparatus of claim 22, wherein signals transmitted through resources allocated by each of the messages are combined by the base station.

24. The apparatus of claim 18, wherein the message comprises a Code Division Multiple Access (CDMA)_Allocation_Information Element (IE).

25. The apparatus of claim 18, wherein the modem receives information on the first set of ranging code and information on the second set of ranging codes.

26. The apparatus of claim 25, wherein the information on the first set of the ranging codes indicates a range of the ranging codes by one of a number of the codes and indexes of the codes.

27. An apparatus for a base station in a wireless communication system, the apparatus comprising:
a modem for transmitting information on a first set of ranging codes and information on a second set of ranging codes, for receiving a ranging code of the first set of ranging codes from a terminal, and
for transmitting a message comprising resource allocation information,
wherein a retransmission of the ranging request message is supported if the first set of ranging codes is used and the retransmission of the ranging request message is not supported if the second set of ranging codes is used.

28. The apparatus of claim 27, wherein
the modem transmits a message comprising resource allocation information for the retransmission.

29. The apparatus of claim 28, wherein the information on the first set of the ranging codes indicates a range of the first set of the ranging codes by one of a number of the codes and indexes of the codes.

30. The apparatus of claim 28, wherein the modem combines signals received through the resources allocated by each of the messages.

31. The apparatus of claim 27, wherein the message comprises an index of the ranging code transmitted from the terminal and a frame index carrying the ranging code transmitted from the terminal.

32. The apparatus of claim 27, wherein the message comprises information on the retransmission, and
wherein the information on the retransmission comprises at least one of an Automatic Repeat reQuest (ARQ) channel identifier, an ARQ identifier sequence number, and a value indicating whether to feed back ACKnowledge/Non-ACKnowledge (ACK/NACK).

33. The apparatus of claim 27, wherein the message further comprises resource allocation information and information on the retransmission of another terminal which transmits a ranging codes in a same frame as the terminal.

34. The apparatus of claim 27, wherein the message comprises a Code Division Multiple Access (CDMA)_Allocation_Information Element (IE).

* * * * *